(No Model.) 2 Sheets—Sheet 1.

E. P. CALDWELL.
SNOW PLOW.

No. 405,301. Patented June 18, 1889.

Witnesses.
J. Jessen
A. M. Gaskill

Inventor.
Edward P. Caldwell.
By Paul & Merwin attys.

(No Model.) 2 Sheets—Sheet 2.

E. P. CALDWELL.
SNOW PLOW.

No. 405,301. Patented June 18, 1889.

Witnesses.
J. Jessen
A. M. Gaskill

Inventor.
Edward P. Caldwell
By Paul & Merwin Att'ys

UNITED STATES PATENT OFFICE.

EDWARD P. CALDWELL, OF MINNEAPOLIS, MINNESOTA.

SNOW-PLOW.

SPECIFICATION forming part of Letters Patent No. 405,301, dated June 18, 1889.

Application filed February 11, 1889. Serial No. 299,370. (No model.)

*To all whom it may concern:*

Be it known that I, EDWARD P. CALDWELL, of Minneapolis, in the county of Hennepin and State of Minnesota, have invented certain Improvements in Snow-Plows, of which the following is a specification.

This invention relates to improvements in snow-plows for removing the snow from railway-tracks. The objects I have in view are to provide an improved form of cutter for loosening the snow and conducting it into a fan chamber or casing, from which it is discharged by a revolving fan, and an improved mechanism for driving the fan and cutter.

The invention consists, generally, in the construction and combination hereinafter described, and particularly pointed out in the claims.

Figure 1:
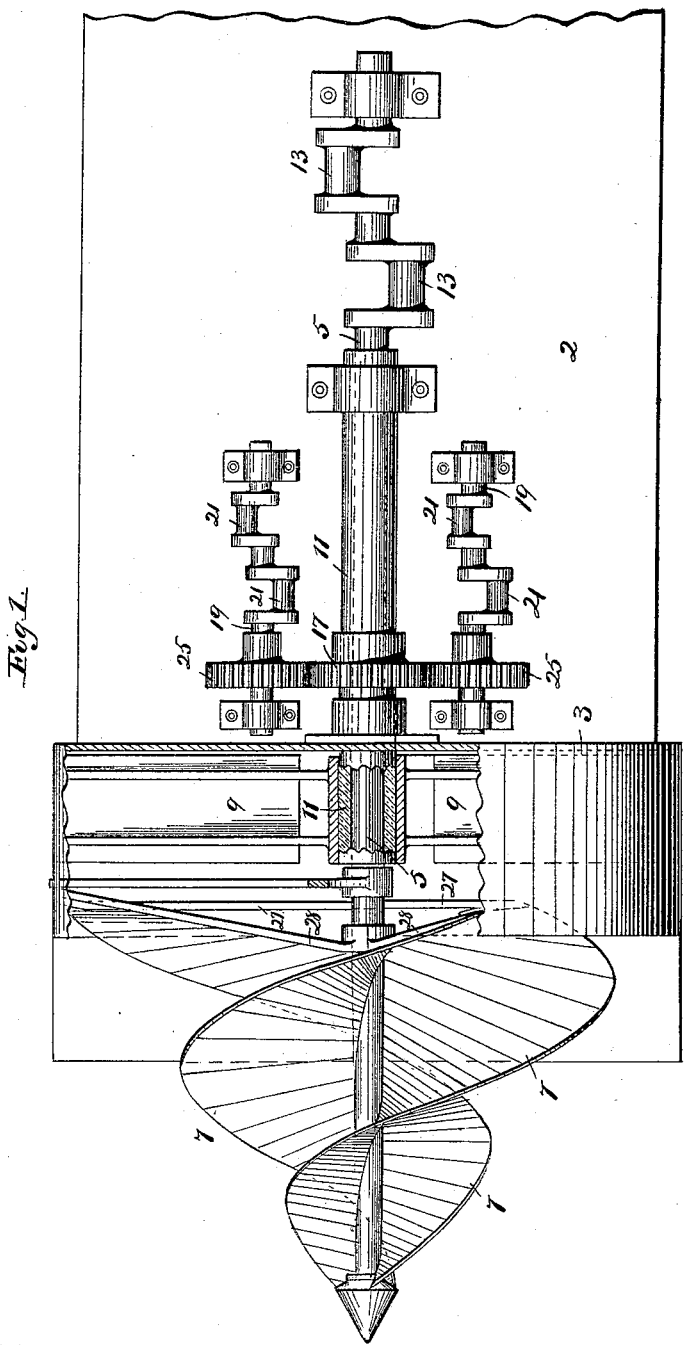
Figure 2:
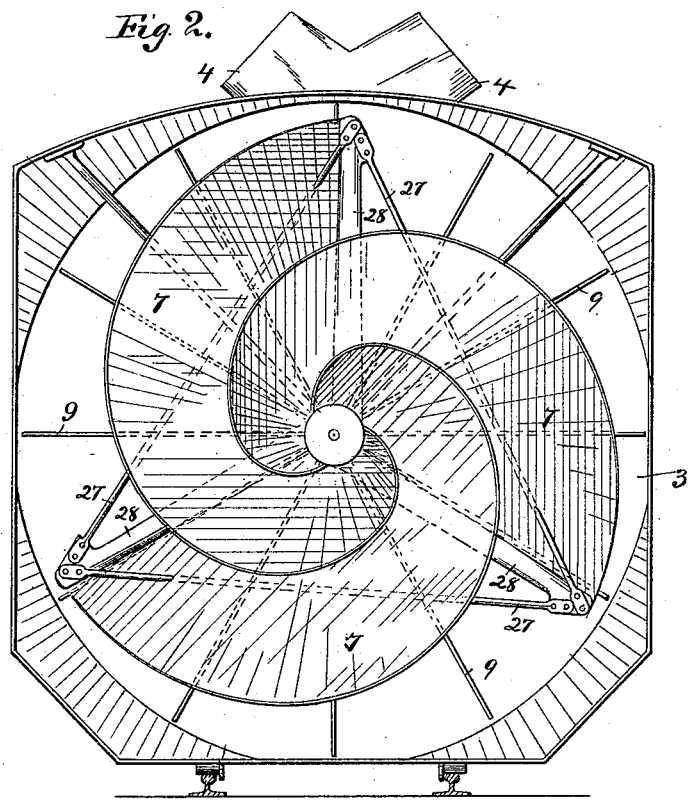
Figure 3:
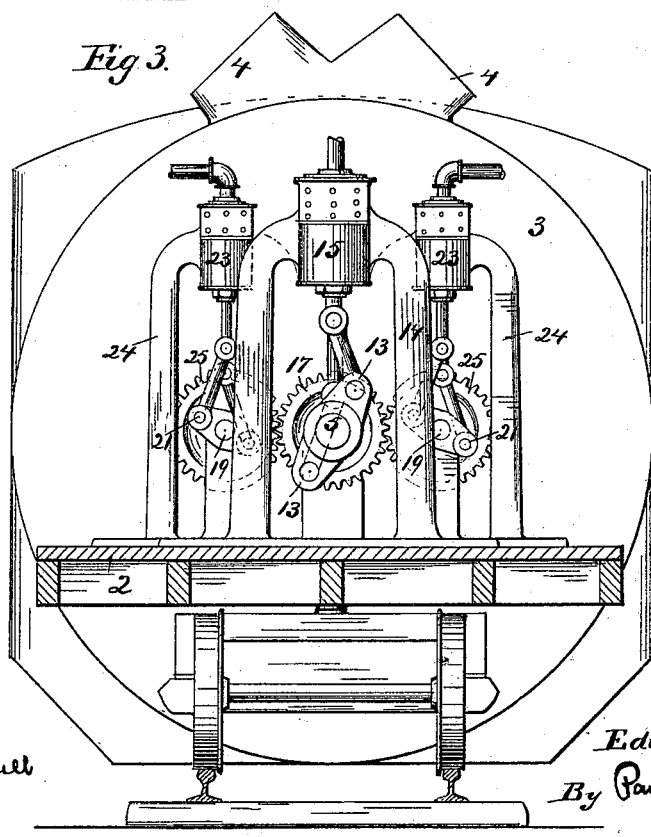

In the accompanying drawings, forming a part of this specification, Figure 1 is a plan view, partly in section, of my improved devices. Fig. 2 is a front end elevation. Fig. 3 is a rear elevation, partly in section.

In the drawings, 2 represents a suitable car or truck upon which the apparatus is mounted. A fan-casing 3 is arranged at the forward end of the car 2. This casing is open in front, and is provided with a suitable discharge opening or openings 4 in its peripheral wall. A shaft 5 is mounted in suitable bearings on the car and extends through the fan-casing and projects beyond the front end thereof. This shaft is preferably at right angles to the front of the casing. Secured to the forward end of the shaft 5 is a conical cutter formed of a series of spirally-arranged knives 7, which taper toward the end of the shaft which forms the apex of the cutter. The base of the conical cutter is preferably of substantially the diameter of the fan-casing, and preferably extends into the open front of said casing. The spaces between the knives and between their ends are open and lead into the front of the fan-casing.

A fan 9 is arranged in the fan-casing in the rear of the conical cutter. This fan is mounted upon an independent hollow shaft 11, that surrounds the shaft 5, and is supported in suitable bearings.

The shaft 5 is preferably provided with cranks 13, and I prefer to arrange a double-cylinder engine 15 upon a standard 14 directly over said shaft, and having its piston-rods connected with said cranks for the purpose of driving the shaft 5. I prefer to drive the fan-shaft by independent means, preferably arranged as follows:

A gear-wheel 17 is secured upon the fan-shaft. Shafts 19 are arranged upon opposite sides of the fan-shaft, and they are each provided with double cranks 21. Engines 23 are arranged upon standards 24 over said shafts 19 and are connected to the cranks 21. Gear-wheels 25 are secured upon the shafts 19 and engage with the gear-wheel 17 upon the fan-shaft.

The fan-shaft may be driven in either direction, while the cutter-shaft 5 is preferably driven constantly in one direction.

The inner sides of the cutter-blades are preferably secured throughout their entire length to the shaft 5, and the cutter may also be provided with braces 27 and 28 for the purpose of firmly securing the cutters to the shaft.

The operation of the device is as follows: The cutter-shaft being revolved, the conical cutter enters the snow and loosens it and causes it to pass back between the blades, through the base of the cutter, and into the open end of the fan-casing, where it is taken up by the revolving fan and thrown out of the casing. The cutter-shaft is revolved by the engine connected with it, and the independent shafts upon opposite sides of the fan-shaft are revolved by the engines connected with them. These shafts may be driven in either direction, and thereby the fan may be rotated in either direction and the snow thrown out at either side of the casing.

I claim as my invention—

1. A snow-plow comprising, in combination, a conical cutter consisting of spirally-arranged knives tapering from the base of the cutter to its apex, and with open spaces between the rear ends of the knives at the base of the cutter, a fan-casing located in the rear of said cutter and having an open front, and a revolving fan located in said casing, substantially as described.

2. The combination, in a snow-plow, of a casing having an open front, a shaft extending through said casing and projecting in front thereof, a conical cutter consisting of a series of spirally-arranged tapering knives secured to said shaft, with open spaces between the knives and between their rear ends, and a revolving fan located in said casing in the rear of said cutter, substantially as described.

3. The combination, in a snow-plow, of a casing having an open front, a shaft extending through said casing and projecting in front thereof, a conical cutter consisting of a series of spirally-arranged tapering knives secured to said shaft and having their rear ends extending into said casing, and a revolving fan located in said casing in the rear of said cutter, substantially as described.

4. The combination, with the revolving shaft provided with a cutter at its forward end, of the hollow shaft arranged upon said cutter-shaft and provided with a fan, a gear-wheel upon said hollow shaft, independent shafts located upon opposite sides of said hollow shaft, gear-wheels upon said shafts meshing with the gear-wheel upon said hollow shaft, and independent means for driving said cutter-shaft and said independent shafts, substantially as described.

In testimony whereof I have hereunto set my hand this 1st day of February, 1889.

EDWARD P. CALDWELL.

In presence of—
   A. M. GASKILL,
   A. C. PAUL.